US012725267B2

(12) United States Patent
Park et al.

(10) Patent No.: US 12,725,267 B2
(45) Date of Patent: Sep. 1, 2026

(54) BOTTOM-UP INSTANCE SEGMENTATION METHOD AND DEVICE

(71) Applicant: DAEGU GYEONGBUK INSTITUTE OF SCIENCE AND TECHNOLOGY, Daegu (KR)

(72) Inventors: Sang Hyun Park, Daegu (KR); Acevedo Miguel Andres Luna, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 225 days.

(21) Appl. No.: 18/714,698

(22) PCT Filed: Aug. 4, 2022

(86) PCT No.: PCT/KR2022/011515
§ 371 (c)(1),
(2) Date: May 30, 2024

(87) PCT Pub. No.: WO2023/106546
PCT Pub. Date: Jun. 15, 2023

(65) Prior Publication Data

US 2025/0022139 A1 Jan. 16, 2025

(30) Foreign Application Priority Data

Dec. 9, 2021 (KR) ........................ 10-2021-0175492
Jan. 21, 2022 (KR) ........................ 10-2022-0009374

(51) Int. Cl.
*G06T 7/12* (2017.01)
*G06T 7/11* (2017.01)
(Continued)

(52) U.S. Cl.
CPC ...... *G06T 7/12* (2017.01); *G06T 2207/30024* (2013.01)

(58) Field of Classification Search
CPC ............. G06T 7/12; G06T 2207/30024; G06T 2207/20081; G06T 2207/20084;
(Continued)

(56) References Cited

U.S. PATENT DOCUMENTS

2013/0322754 A1* 12/2013 Lee ......................... G06T 7/143
382/171
2017/0068844 A1* 3/2017 Friedland ............. G06V 10/764
(Continued)

FOREIGN PATENT DOCUMENTS

KR 10-2020-0087808 7/2020
KR 10-2021-0063116 6/2021
KR 10-2021-0145778 12/2021

OTHER PUBLICATIONS

Nord M, Vullum PE, MacLaren I, Tybell T, Holmestad R. Atomap: a new software tool for the automated analysis of atomic resolution images using two-dimensional Gaussian fitting. Adv Struct Chem Imaging. 2017 (Year: 2017).*

(Continued)

*Primary Examiner* — Chineyere Wills-Burns
*Assistant Examiner* — Lucius Cameron Green Allen
(74) *Attorney, Agent, or Firm* — LEX IP MEISTER, PLLC

(57) ABSTRACT

Disclosed are a bottom-up instance segmentation method and apparatus. The bottom-up instance segmentation method includes acquiring an image, identifying a boundary of each instance and a shared pixel between instances by encoding the image into a seed map and a plurality of sigma maps based on a previously trained bottom-up segmentation model, and outputting a segmented image for an object in (Continued)

the image based on the boundary of each instance and the shared pixel between instances.

10 Claims, 9 Drawing Sheets

(51) Int. Cl.
*G06T 7/143* (2017.01)
*G06V 10/26* (2022.01)
*G06V 10/44* (2022.01)
*G06V 20/69* (2022.01)

(58) Field of Classification Search
CPC ........... G06T 7/143; G06T 7/11; G06V 10/26; G06V 10/44; G06V 20/69
USPC .......................................................... 382/173
See application file for complete search history.

(56) References Cited

U.S. PATENT DOCUMENTS

2018/0336454 A1* 11/2018 Lim ...................... G06F 18/214
2021/0073986 A1 3/2021 Kapur et al.
2022/0092869 A1* 3/2022 Abbeloos ............. G06N 3/0455
2022/0237799 A1* 7/2022 Price ..................... G06T 3/4046
2022/0366564 A1* 11/2022 Arbel .................... G06T 7/0012
2023/0066976 A1* 3/2023 Troude ................. G06V 20/698

OTHER PUBLICATIONS

Davy Neven et al., “Instance Segmentation by Jointly Optimizing Spatial Embeddings and Clustering Bandwidth”, CVPR. Jun. 20, 2019, pp. 8837-8845.
Jiaqian Yu et al., “Learning Submodular Losses with the Lov’asz Hinge”, International Conference on Machine Learning, Jul. 2015, Lille, France.
Simon Graham et al., “Hover-Net: Simultaneous segmentation and classification of nuclei in multi-tissue histology images”, Medical Image Analysis 58 (2019) 101563, Sep. 18, 2019.
N. Ezgi Wood et al., “A fully-automated, robust, and versatile algorithm for long-term budding yeast segmentation and tracking”, PLOS ONE, Mar. 27, 2019, https://doi.org/10.1371/journal.pone.0206395.
Zhenbo Xu et al., “Segment as Points for Efficient Online Multi-Object Tracking and Segmentation”, arXiv:2007.01550v1 [cs.CV] Jul. 3, 2020.
Anonymous, “Bottom-up Amodal Nuclear Segmentation”, CVPR 2022, Paper ID 7366.

* cited by examiner

FIG. 6

| | Ground Truth | Prediction A | Prediction B | Prediction C | Prediction D |
|---|---|---|---|---|---|
| DICE_2 | | 0.456 | 0.710 | 0.774 | |
| aDICE_2 | | 0.714 | 0.714 | 0.786 | 0.786 |
| AJI | | 0.382 | 0.556 | 0.647 | |
| aAJI | | 0.556 | 0.556 | 0.647 | 0.647 |
| PQ | | 0.267 | 0.267 | 0.489 | |
| aPQ | | 0.389 | 0.389 | 0.489 | 0.489 |

BOTTOM-UP INSTANCE SEGMENTATION METHOD AND DEVICE

TECHNICAL FIELD

The present disclosure relates to a bottom-up instance segmentation method and apparatus for performing amodal instance segmentation of cells or nuclei having translucent stacks and occlusion by clustering pixels grouped using space embedding to maintain morphological features of an instance in a histopathology image.

BACKGROUND ART

Segmentation of nuclei facilitates further studies of spatial distribution performed for quantitative evaluation of a disease or prognosis indicators for cancer rating.

In general, automated nuclear segmentation methods are mainly innovated by the recent development of deep learning, using an H & E (hematoxylin and eosin) dyeing tissue slide due to the ability to reveal a tissue structure and nucleus form.

However, nuclear segmentation lacks data and especially requires costly labeling and collection, and thus detailed structured annotation is frequently needed for deep learning. At the same time, manual delineation may be difficult due to variability in an observer and between observers. Therefore, reproducible and expandable alternatives are preferred.

Conventionally, each pixel is assigned to a unique predictive instance and segmented using a modal method that detects nuclei. However, in overlapping clusters, exact delineation and separation of an instance may raise a unique problem in most conventional methods. In addition, since sizes and shapes of nuclei are variously distributed, the spatial distribution is more complicated due to overlap and occlusion.

Meanwhile, general amodal segmentation is performed top-down, where segmentation is performed after finding an object to be an instance. Such a top-down method shows impressive performance on modal data. However, the top-down method is not effective for segmentation of data having a large number of instances, such as a single histopathology image, due to slow inference time.

In addition, the proposed bounding box method is suitable for segmentation in general images, but may not be suitable for histopathology images including small nuclei.

Therefore, a bottom-up method is preferred for nuclear segmentation. To perform amodal segmentation according to this bottom-up strategy, spatial embedding commonly used to predict a single center of an object may be redefined, and attraction centers as many as shared boundaries owned by an instance may be predicted by extension thereof.

When such bottom-up strategy is used, it is possible to model primary data where cell shapes tend to be round and may be separated by elliptical margins. However, center target loss prevents instances from sharing pixels since an offset of a pixel and margin reduce a distance to a single center.

In other words, the above-described bottom-up method may also be undesirable for nuclear instance clusters where there are many amodal instances of cells or nuclei having translucent stacks and occlusion.

Therefore, a method is required to share pixels between segments regardless of size or shape, by proposing a generalized loss target and using a segmentation mechanism to obtain more complete instances.

The above-mentioned background technology is technical information possessed by the inventor to derive the present invention or acquired in a process of deriving the present invention, and cannot necessarily be considered to be known art disclosed to the general public before application for the present invention.

Prior Art Document 1: Davy Neven, Bert De Brabandere, Marc Proesmans, and Luc Van Gool. Instance segmentation by jointly optimizing spatial embeddings and clustering bandwidth. In CVPR, pages 88378845, 2019. 2, 3, 4

Prior Art Document 2: Jiaqian Yu and Matthew Blaschko. Learning submodular losses with the Lovasz hinge. In International Conference on Machine Learning, pages 16231631. PMLR, 2015. 4

Prior Art Document 3: Simon Graham, Quoc Dang Vu, Shan E Ahmed Raza, Ayesha Azam, Yee Wah Tsang, Jin Tae Kwak, and Nasir Rajpoot. Hover-net: Simultaneous segmentation and classification of nuclei in multi-tissue histology images. Medical Image Analysis, 58:101563, 2019. 1, 2, 3, 5, 7, 8

DISCLOSURE

Technical Problem

A task of an embodiment of the present disclosure is to improve accuracy of amodal instance segmentation of cells or nuclei having translucent stacks and occlusion by clustering pixels grouped using spatial embedding to maintain morphological features of an instance in a histopathology image.

A task of an embodiment of the present disclosure is to cluster pixels grouped by spatial embedding and construct a complete instance mask using a flexible Gaussian margin that may adapt to various sizes and patterns.

A task of an embodiment of the present disclosure is to accurately evaluate amodal prediction and avoid excessive penalties through a unique matching algorithm that updates a common metric used in nuclear segmentation.

Objects of the present disclosure are not limited to the above-mentioned object, and other objects and advantages of the present disclosure, which are not mentioned, will be understood through the following description, and will become apparent from embodiments of the present disclosure. It is also to be understood that the objects and advantages of the present disclosure may be realized by means and combinations thereof set forth in claims.

Technical Solution

A bottom-up instance segmentation method according to an embodiment of the present disclosure includes acquiring an image, identifying a boundary of each instance and a shared pixel between instances by encoding the image into a seed map and a plurality of sigma maps based on a previously trained bottom-up segmentation model, and outputting a segmented image for an object in the image based on the boundary of each instance and the shared pixel between instances.

In addition, it is possible to further provide another method, another system, and a computer-readable recording medium storing a computer program for executing the method to implement the present disclosure.

Other aspects, features and advantages in addition to those described above will become apparent from the following drawings, claims and detailed description of the invention.

Advantageous Effects

According to an embodiment of the present disclosure, it is possible to improve accuracy of amodal instance segmentation of cells or nuclei having translucent stacks and occlusion by clustering pixels grouped using spatial embedding to maintain morphological features of an instance in a histopathology image.

In addition, it is possible to cluster pixels grouped by spatial embedding and construct a complete instance mask using a flexible Gaussian margin that may adapt to various sizes and patterns.

In addition, it is possible to accurately evaluate amodal prediction and avoid excessive penalties by applying a unique matching algorithm that updates a common metric used in nuclear segmentation, thereby improving identification accuracy of ambiguous boundaries/closures of complex nuclear clusters.

The effects of the present disclosure are not limited to those mentioned above, and other effects not mentioned herein may be clearly understood by those skilled in the art from the description below.

DESCRIPTION OF DRAWINGS

FIG. 6 is an example diagram for describing metrics for evaluating amodal prediction matching according to an embodiment.

BEST MODE

Figure 1:
FIG. 1 is a diagram schematically illustrating a bottom-up instance segmentation system according to an embodiment.
Figure 1:
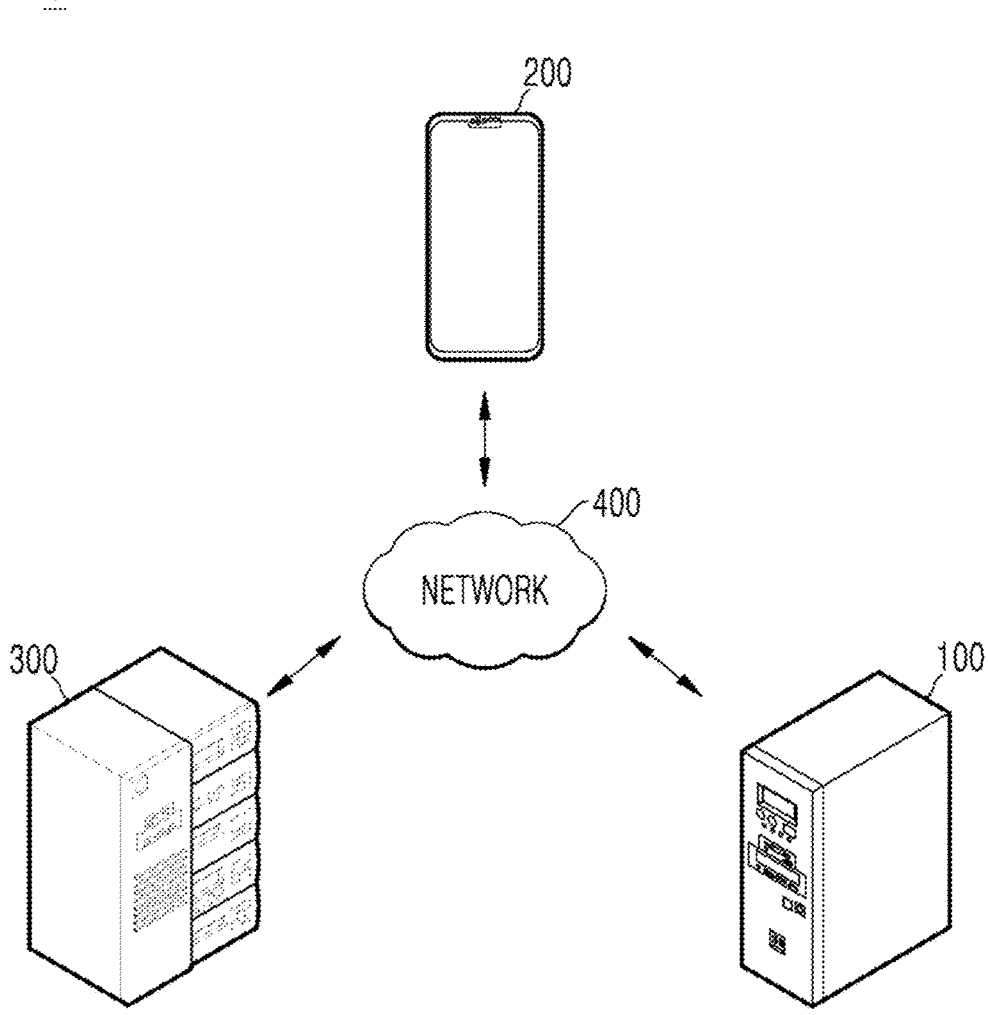

The advantages and features of the present disclosure and methods of achieving the same will be apparent from the embodiments described below in detail in conjunction with the accompanying drawings.

However, the description of particular exemplary embodiments is not intended to limit the present disclosure to the particular exemplary embodiments disclosed herein, but on the contrary, it should be understood that the present disclosure is to cover all modifications, equivalents, and alternatives falling within the spirit and scope of the present disclosure. The embodiments disclosed below are provided so that this disclosure will be thorough and complete and will fully convey the scope of the present disclosure to those skilled in the art. In the following description of embodiments of the present disclosure, a detailed description of related known technology will be omitted when the same may obscure the subject matter of the embodiments of the present disclosure.

The terminology used herein is used for the purpose of describing particular example embodiments only and is not intended to be limiting. It must be noted that, as used herein and in the appended claims, the singular forms include the plural forms unless the context clearly dictates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. Furthermore, terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

Figure 2:
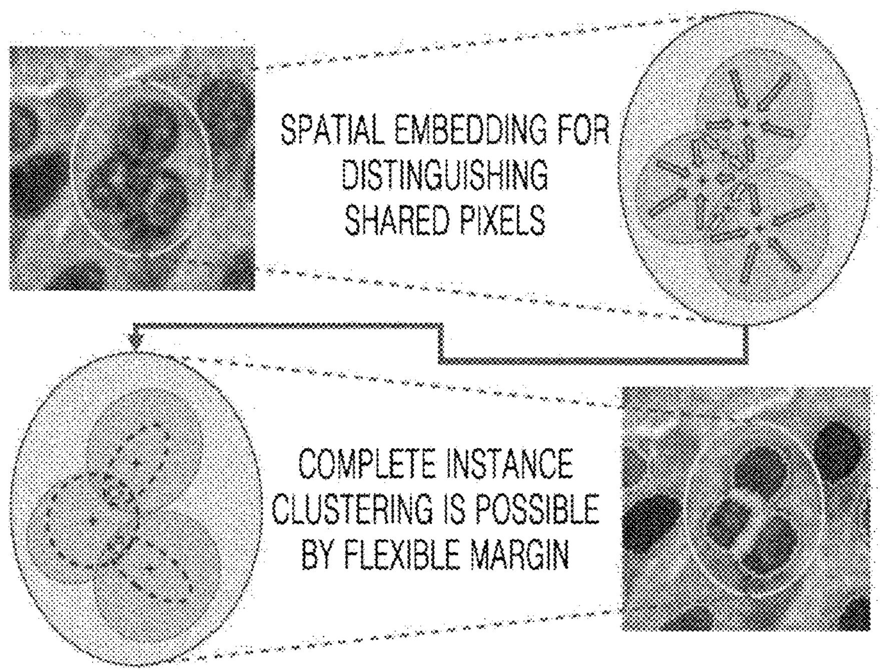
FIG. 2 is a diagram for describing nuclear cluster segmentation according to an embodiment.

FIG. 1 is a diagram schematically illustrating a bottom-up instance segmentation system according to an embodiment, and FIG. 2 is a diagram for describing nuclear cluster segmentation according to an embodiment.

Referring to FIG. 1, the bottom-up instance segmentation system 1 may include a bottom-up instance segmentation apparatus 100, a user terminal 200, a server 300, and a network 400.

A histopathology image basically has a three-dimensional structure, and it is common to find nuclei touching and overlapping each other. However, current nuclear segmentation strategies are limited to modal segmentation, which produces segmentation masks whose predictions are unnatural and frequently fails to correctly delineate boundaries of clustered nuclei. On the other hand, amodal segmentation has the potential to retain true boundary information, but is generally limited to top-down segmentation networks, which are not suitable for histopathological data.

To solve this problem, the bottom-up instance segmentation system 1 of the embodiment may perform amodal segmentation using spatial embedding to obtain complete instances with an elliptical clustering margin around an instance center. As illustrated in FIG. 2, a learned feature to construct amodal space embedding is a key component in resolving ambiguous boundaries and occlusion in a cluster nucleus.

In other words, the bottom-up instance segmentation system 1 may use a bottom-up model that uses spatial embedding to maintain most morphological features of the segmented nucleus, for more accurate quantitative studies.

This bottom-up model utilizes flexible Gaussian margins that may adapt to different sizes and patterns, allowing clustering of grouped pixels using spatial embedding and constructing complete instance masks.

In addition, the bottom-up model of the embodiment may update common metrics used in nuclear segmentation to accurately evaluate amodal predictions and apply unique matching algorithms to avoid excessive penalties.

In this way, it is possible to more realistically represent a basic cell distribution in a histopathology sample and more accurately perform quantitative evaluation of morphological features such as shapes and sizes associated with grading and other studies of cancer tissue. In addition, an amodal mask may be used to prevent learning truncated and unnatural features of the nucleus.

Meanwhile, in an embodiment, users may access an application or website implemented on the user terminal 200 and perform processes such as creating and learning a network of the bottom-up instance segmentation apparatus 100.

The user terminal 200 may be a desktop computer, a smartphone, a notebook, a tablet computer, a smart TV, a mobile phone, a personal digital assistant (PDA), a laptop computer, a media player, a micro server, a global positioning system (GPS) device, an e-book terminal, a digital broadcasting terminal, a navigation device, a kiosk, an MP3 player, a digital camera, a home appliance, and other mobile or non-mobile computing devices operated by a user, but is not limited thereto.

In addition, the user terminal 200 may be a wearable terminal such as a watch, glasses, a hair band, or a ring equipped with a communication function and a data processing function. The user terminal 200 is not limited to the above-described content, and any terminal capable of web browsing may be used without limitation.

In an embodiment, the bottom-up instance segmentation system 1 may be implemented by the bottom-up instance segmentation apparatus 100 and/or the server 300.

In an embodiment, the bottom-up instance segmentation apparatus 100 may be implemented in the server 300. In this instance, the server 300 may be a server for operating the bottom-up instance segmentation system including the bottom-up instance segmentation apparatus 100 or a server that implements part or all of the bottom-up instance segmentation apparatus 100.

In an embodiment, the server 300 may be a server that performs bottom-up amodal segmentation by clustering by ellipse margins and creating pixel groups across several centers such that instances may share pixels through amodal spatial embeddings (ASense) for nuclear segmentation, and controls an operation of the bottom-up instance segmentation apparatus 100 for the overall process of performing amodal nuclear instance segmentation to capture a three-dimensional structure in a pathology image common between instances of cells or nuclei having translucent stacks and occlusion.

In addition, the server 300 may be a database server that provides data to operate the bottom-up instance segmentation apparatus 100. Additionally, the server 300 may include a web server, an application server, or a deep learning network provision server.

Further, the server 300 may include a big data server and an AI server required to apply various artificial intelligence algorithms, and a calculation server that performs calculations of various algorithms.

Further, in the present embodiment, the server 300 may include the servers described above or may be networked with these servers. That is, in the present embodiment, the server 300 may include the above-mentioned web server and AI server or may be networked with these servers.

In the bottom-up instance segmentation system 1, the bottom-up instance segmentation apparatus 100 and the server 300 may be connected by the network 400. The network 400 may encompass, for example, wired networks such as local area networks (LANs), wide area networks (WANs), metropolitan area networks (MANs), and integrated service digital networks (ISDNs), or wireless networks such as wireless LANs, CDMA, Bluetooth, and satellite communications. However, the scope of the present disclosure is not limited thereto. In addition, the network 400 may transmit and receive information using short-range communication and/or long-distance communication.

In addition, the network 400 may include connection of network elements such as hubs, bridges, routers, switches, and gateways. The network 400 may include one or more connected networks, including a public network such as the Internet and a private network such as a secure enterprise private network, for example, a multi-network environment. Access to network 400 may be provided through one or more wired or wireless access networks. Furthermore, the network 400 may support an IoT (Internet of Things) network and/or 5G communication that exchanges and processes information between distributed components such as objects.

Figure 3:
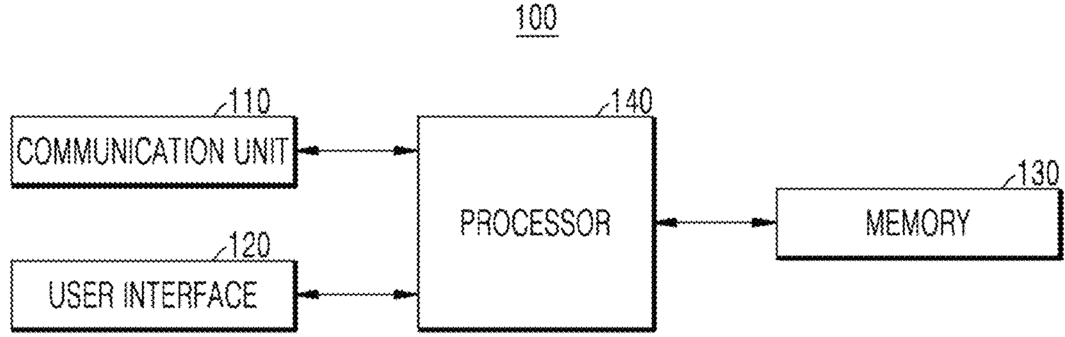
FIG. 3 is a block diagram schematically illustrating a bottom-up instance segmentation apparatus according to an embodiment.

FIG. 3 is a block diagram schematically illustrating a bottom-up instance segmentation apparatus according to an embodiment.

Referring to FIG. 3, the bottom-up instance segmentation apparatus 100 may include a communication unit 110, a user interface 120, a memory 130, and a processor 140.

The communication unit 110 may link with the network 400 to provide a communication interface necessary to provide transmission and reception signals between external devices in the form of packet data. In addition, the communication unit 110 may be a device including hardware and software necessary to transmit and receive signals such as control signals or data signals through wired or wireless connection with other network devices.

That is, the processor 140 may receive various data or information from an external device connected through the communication unit 110, and may transmit various data or information to the external device.

In an embodiment, the user interface 120 may include an input interface receiving input of user requests and commands for controlling the operation of the bottom-up instance segmentation apparatus 100 (for example, changing network parameters, changing network learning conditions, etc.).

Further, in an embodiment, the user interface 120 may include an output interface that outputs an instance segmentation result. That is, the user interface 120 may output results according to user requests and commands. The input interface and the output interface of the user interface 120 may be implemented as the same interface.

The memory 130 may store control software and various information necessary for controlling (computing) the operation of the bottom-up instance segmentation apparatus 100, and may include a volatile or nonvolatile recording medium.

The memory 130 is connected to one or more processors 140 through an electrical or internal communication interface and may store code causing the processor 140 to control the image restoration device 100 when executed by the processor 140.

Here, the memory 130 may be a non-transitory storage medium such as a magnetic storage medium or a flash storage medium, or may include a temporary storage medium such as RAM. However, the scope of the present invention is not limited thereto. The memory 130 may include an internal memory and/or an external memory, and may include a volatile memory such as a DRAM, an SRAM, or an SDRAM, a nonvolatile memory such as one time programmable ROM (OTPROM), a PROM, an EPROM, an EEPROM, a mask ROM, a flash ROM, a NAND flash memory, or a NOR flash memory, a flash drive such as an SSD, a compact flash (CF) card, an SD card, a Micro-SD card, a Mini-SD card, an Xd card, or a memory stick, or a storage device such as an HDD.

Further, information related to an algorithm for performing learning according to the present disclosure may be stored in the memory 130. In addition, various information necessary within the scope of achieving the purpose of the present disclosure may be stored in the memory 130, and the information stored in the memory 130 may be updated by being received from a server or external device or input by the user.

The processor 140 may control the overall operation of the bottom-up instance segmentation apparatus 100. Specifically, the processor 140 is connected to a component of the bottom-up instance segmentation apparatus 100 including the memory 130, and may execute at least one command stored in the memory 130 to control the overall operation of the bottom-up instance segmentation apparatus 100.

The processor 140 may be implemented in various ways. For example, the processor 140 may be implemented as at least one of an application specific integrated circuit (ASIC), an embedded processor, a microprocessor, hardware control logic, a hardware finite state machine (FSM), or a digital signal processor (DSP).

The processor 140 is a type of central processing device and may control the operation of the image restoration device 100 by executing control software installed on the memory 130. The processor 140 may include all types of devices capable of processing data. Here, "processor" may mean, for example, a data processing device built into hardware having a physically structured circuit to perform a function expressed by code or instructions included in a program.

Hereinafter, a specific bottom-up instance segmentation process in the processor 140 will be described with reference to FIGS. 4 and 5 and Equations 1 to 7.

Figure 4:
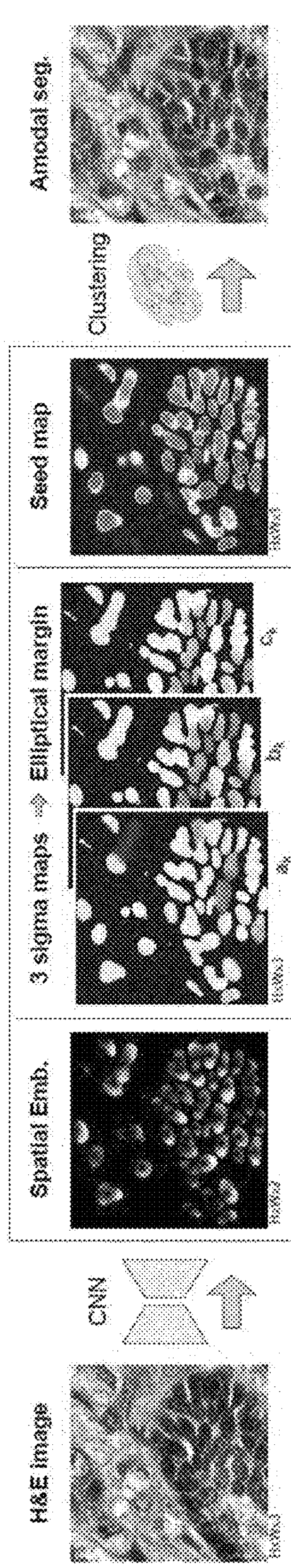
FIG. 4 is a diagram schematically illustrating a network structure of a bottom-up segmentation model according to an embodiment.

FIG. 4 is a diagram schematically illustrating a network structure of a bottom-up segmentation model according to an embodiment.

In an embodiment, the processor 140 may perform amodal nucleus segmentation capable of maintaining a natural shape of an instance in a clustered nucleus region.

As illustrated in FIG. 4, the bottom-up segmentation model of the embodiment may be configured to encode an image into a series of maps through an encoder (for example, CNN) to determine a boundary of an instance and identify a shared pixel for amodal segmentation.

For bottom-up approach to perform amodal segmentation, such as the bottom-up segmentation model, a shared pixel needs to be accounted for in terms of a center of attraction and cluster margin.

A simple method to construct such spatial embedding is to divide each amodal ground truth (GT) mask into subcomponents and directly regress a unique attraction center for each segment separately. However, this separates a spatial embedding task from cluster margin estimation and therefore requires additional post-processing. This post-processing may not be optimal for several instance sizes.

Therefore, the processor 140 may learn optimal features for clustering large and small instances by integrating spatial embedding and margin estimation into a single task.

Accordingly, the processor 140 may construct spatial embeddings and margins taking into account a complete instance mask at all times, learn features that describe the basic properties of the nucleus, and avoid the use of truncated samples. This is a key property for accurately identifying and segmenting nuclei in dense regions.

That is, in an embodiment, it is possible to treat instance segmentation as a pixel allocation problem and try to associate pixels with correct objects. To this end, the processor 140 may learn an offset vector of each pixel that points to a center of an object. Here, the object may be a cell nucleus.

Therefore, in an embodiment, the loss for a pixel far from a center may be mitigated by learning an optimal clustering region for each object, unlike a standard regression approach. Further, in an embodiment, a seed map for each semantic class may be learned to find the center of the object. A detailed description thereof will be provided later.

The processor 140 may indirectly learn an optimal offset $e_i=x_i+O_i$ and a surrounding margin $\delta$ for a center $C_k$ of an object and perform a framework for clustering pixels $X=\{x_0, x_1, \ldots, x_N\}$ into an instance $S=\{S_0, S_1, \ldots, S_N\}$. Here, $O_i$ is an offset vector for each pixel $x_i$. Here, $C_k$ may be two-dimensional coordinates having an x-coordinate and a y-coordinate, such as $(C_{kx}, C_{ky})$.

The processor 140 in an embodiment may cluster large and small adjacent objects without negatively affecting each other through the bottom-up instance segmentation approach described above.

In particular, the processor 140 may use a Gaussian function $\phi_k(e_i)$ to convert a distance between an offset of a predicted pixel and a center of an instance into a probability of belonging to the instance. The Gaussian function $\phi_k(e_i)$ may be expressed as the following Equation 1.

$$\phi_k(e_i) = \exp\left(\frac{\|e_i - C_k\|^2}{2\sigma_k^2}\right) \quad \text{[Equation 1]}$$

In this instance, a high probability value may mean being closer to the center of the instance, and a low probability value may be applied as a background pixel.

A margin of a distance allowed for a pixel from an instance center may be controlled by a sigma value of the Gaussian function. This margin is unique to each instance, and thus a larger object may have a greater distance between the instance center and the pixel.

For example, a Gaussian function $\phi_k(e_i)>0.5$ may be assigned to an instance k rather than the corresponding pixel at the position $x_i$.

Therefore, a margin as shown in Equation 2 below may be controlled by modifying a sigma parameter of the Gaussian function.

$$\text{margin} = \sqrt{-2\sigma_k^2 \ln 0.5} \quad \text{[Equation 2]}$$

When the sigma is large, the margin becomes large, and when the sigma is small, the margin becomes small. To this end, the bottom-up segmentation model needs to output $\sigma_i$ at each pixel location. As shown in Equation 3 below, $\sigma_k$ may be defined as an average of all $\sigma_i$ belonging to the instance k.

$$\sigma_k = \frac{1}{|S_k|} \sum_{\sigma_i \in S_k} \sigma_i \quad \text{[Equation 3]}$$

For each instance k, the Gaussian function outputs a foreground/background probability map, and thus a binary classification loss may be used for optimization by using a binary foreground/background map of each instance as the ground truth.

In an embodiment, instead of using a standard cross entropy loss function, hinge loss may be used instead.

The hinge loss is a loss function used to train a classifier, especially SVM, in which an X-axis represents a distance from a boundary of a single instance, and a Y-axis represents a loss size or penalty generated by the function according to the distance. A correctly classified point has a small loss size or no loss, while an incorrectly classified instance has a large loss size. At the boundary, a negative distance leads to a high hinge loss, which means that the instance is essentially on the erroneous side of the boundary, and the instance is incorrectly classified. At a positive distance, hinge loss is small or no hinge loss occurs, and hinge loss decreases with increasing distance from the boundary in a positive direction.

This hinge loss is a (piecewise linear) convex surrogate for Jaccard loss, and thus may directly optimize an intersection of each instance. Therefore, there is no need to explain the class imbalance between the foreground and the background. Here, the Jaccard loss is converted into a loss function to directly increase the performance of Jaccard Index, which is used as metric.

The bottom-up segmentation model of the embodiment has no direct supervision of sigma and offset vector output, such as standard regression loss. Instead, co-optimization may be performed to maximize an intersection of each instance mask by receiving a slope using backpropagation through the hinge loss and the Gauss function.

The bottom-up segmentation model of the embodiment is a parameter that may be learned without sigma fixed. Therefore, the bottom-up segmentation model may modify the sigma to more efficiently minimize losses.

That is, the bottom-up segmentation model may modify the sigma so that the size of the region is more suitable for the specific instance, in addition to pulling instance pixels in a (generally small) region around the instance center and pushing background pixels outside of this region.

Intuitively, this may mean that, in the case of a large object, the sigma is applied to make a region around the center larger, so that more instance pixels may point to the inside of the region, and a small object selects a smaller region, so that the pixel more easily points to the outside of the region by more easily applying to the background.

Figure 5:
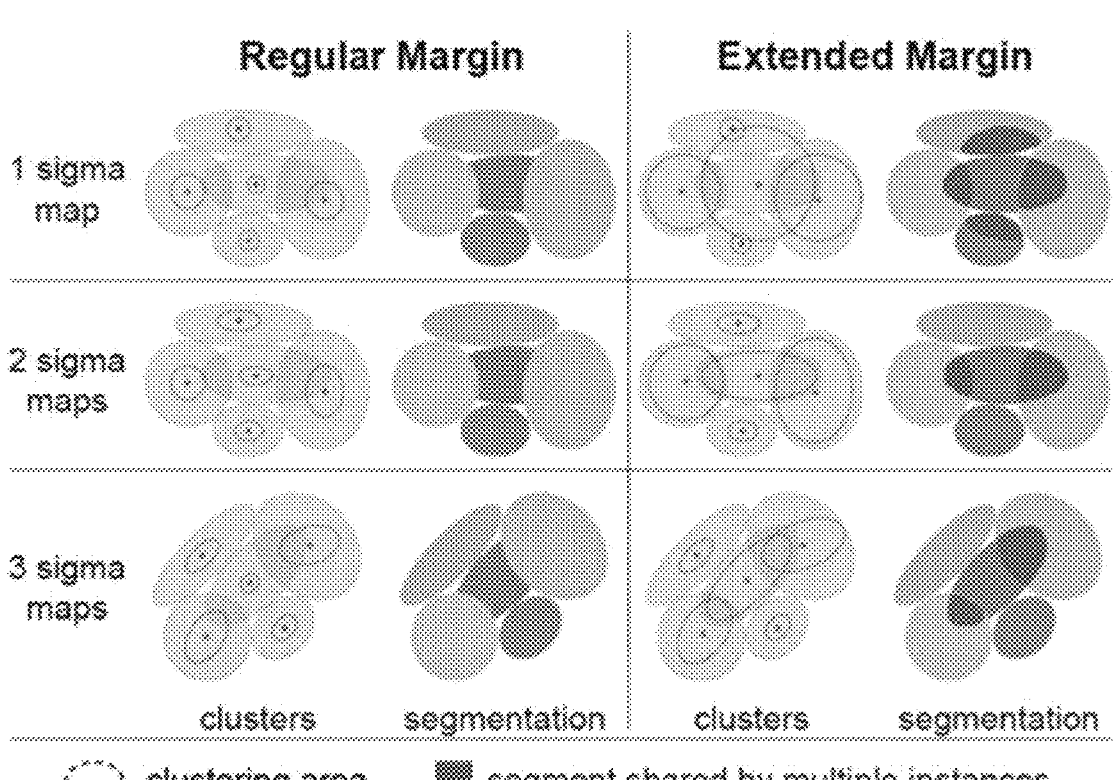
FIG. 5 is an example diagram for describing a cluster margin according to an embodiment.

FIG. 5 is an example diagram for describing a cluster margin according to an embodiment.

Equation 1, which has a scalar value for sigma, may produce a circular margin. Further, Equation 1 expands to use two-dimensional sigma, and may learn an elliptical margin more suitable for an elongated object of a natural image as shown in Equation 4.

$$\phi_k(e_i) = \exp\left(\frac{(e_{ix} - C_{kx})^2}{2\sigma_{kx}^2} - \frac{(e_{iy} - C_{ky})^2}{2\sigma_{ky}^2}\right) \quad \text{[Equation 4]}$$

In an embodiment, an elliptical margin may be desirable since the elliptical margin has a shape that closely resembles a regular shape of a cell or nucleus. In addition, due to the shape and pattern commonly seen in a histopathology image, a circular margin may be unsuitable for clustering an amodal mask in a dense region.

Referring to a 1-sigma map of FIG. 5, a small margin may discard shared pixels, while a larger margin may cluster pixels across instance boundaries due to the tilt and elongation of the instance.

Equation 4 above may describe objects such as pedestrians or trains, but cannot describe various shapes of the nucleus. As a result, in an embodiment, three "sigma maps" may be used to expand a two-dimensional Gaussian function to describe rotation.

That is, in an embodiment, the bottom-up segmentation model may be configured to capture all possible shape variations. This may be expressed as a Gaussian function as shown in the following Equation 5.

$$\phi_k(e_i) = \exp\left(-\left(a_k(e_{ix} - C_{kx})^2 + 2b_k(e_{ix} - C_{kx})(e_{iy} - C_{ky}) + c_k(e_{iy} - C_{ky})^2\right)\right), \quad \text{[Equation 5]}$$

Here, coefficients $a_k$, $b_k$, and $c_k$ (sigma map of FIG. 4) may be defined as sigma values $\sigma_{kx}$ and $\sigma_{ky}$ and a rotation angle $\theta$. That is, the coefficients may be expressed as $$a_k = \frac{\cos^2\theta}{2\sigma_{kx}^2} + \frac{\sin^2\theta}{2\sigma_{ky}^2},\ b_k = \frac{\sin 20}{4\sigma_{kx}^2} + \frac{\sin 20}{4\sigma_{ky}^2},\ \text{and}\ c_k = \frac{\sin^2\theta}{2\sigma_{kx}^2} + \frac{\cos^2\theta}{2\sigma_{ky}^2},$$

the matrix is as shown in Equation 6, and this matrix is a positive-definite matrix. $C_{kx}$ and $C_{ky}$ may mean an x-coordinate and a y-coordinate among coordinates of the center of the object or corresponding instance.

$$\begin{bmatrix} a_k & b_k \\ b_k & c_k \end{bmatrix} \quad \text{[Equation 6]}$$

In an embodiment, a network of the bottom-up segmentation model may require several training steps with initialization without optimizing a rotation factor to ensure convergence.

A main goal of an optimization function is to reduce a distance from the spatial embedding to the center of the instance as close to zero as possible. This may apply a margin to reduce a size.

However, to reconstruct an amodal mask, the bottom-up segmentation model needs to have flexibility to allow pixels in a shared region to have smaller offset values and a margin large enough to cover pixels near the center and in overlapping regions. In this way, it is possible to relax the hinge loss to a probability threshold n that does not affect pixels already exceeding this limit.

Specifically, when the Gaussian function $\phi_k(e_i)$ of Equation 5 is greater than the probability threshold, the Gaussian function $\phi_k(e_i)$ may be regarded as 1. Therefore, pixels in a shared region are not forced to be split between touching instances, but instead tend to group into different nearby centers, which simplifies the clustering process by obtaining the entire group at once. For example, the probability threshold $\eta$ may be set to 0.8.

During inference, each object may be clustered using the spatial embedding and estimated margin. At this stage, the processor 140 may sample each object using the seed map. Referring to FIG. 5, it is possible to see the effect of clustering on the size and shape of the margin and the segmentation mask.

The processor 140 needs to perform clustering around the center of each object during inference. The loss function ensures that spatial embedding pixels lie close to the center of the object, and thus may sample excellent spatial embedding pixels and use the corresponding locations as instance centers.

Therefore, it is possible to learn how far each spatial embedding pixel is arranged from an instance center. A spatial embedding pixel placed significantly close to the instance center receives a high score in the seed map, while a spatial embedding pixel located far from the instance center receives a low score in the seed map. In this way, it is possible to select a spatial embedding pixel having a high seed score during inference. This indicates that embedding is significantly close to the center of the object.

In practice, a seediness score of a spatial embedding pixel needs to be equal to the output of the Gaussian function since the seediness score converts the distance between the embedding and the instance center into a proximity score. That is, the closer the embedding is to the center, the closer the output is to 1.

Therefore, it is possible to train the seed map using a regression loss function. Background pixels may regress to 0 and foreground pixels may regress to Gaussian output.

In an embodiment, a seed map for each semantic class may be trained using a loss function as shown in the following Equation 7.

$$\mathcal{L}_{seed} = \frac{1}{N}\sum_{i}^{N} \mathbb{1}_{\{s_i \in S_k\}} \|s_i - \phi_k(e_i)\|^2 + \mathbb{1}_{\{s_i \in bg\}} \|s_i - 0\|^2 \quad \text{[Equation 7]}$$

$S_i$ is seed output of a pixel i of the bottom-up segmentation model. In this instance, the Gaussian function $\phi_k(e_i)$ may be considered a scalar, and the slope may be calculated only for $S_i$.

Hereinafter, experimental results on implementation performance of the bottom-up segmentation model will be described with reference to FIGS. 6 to 8.

Figure 7:
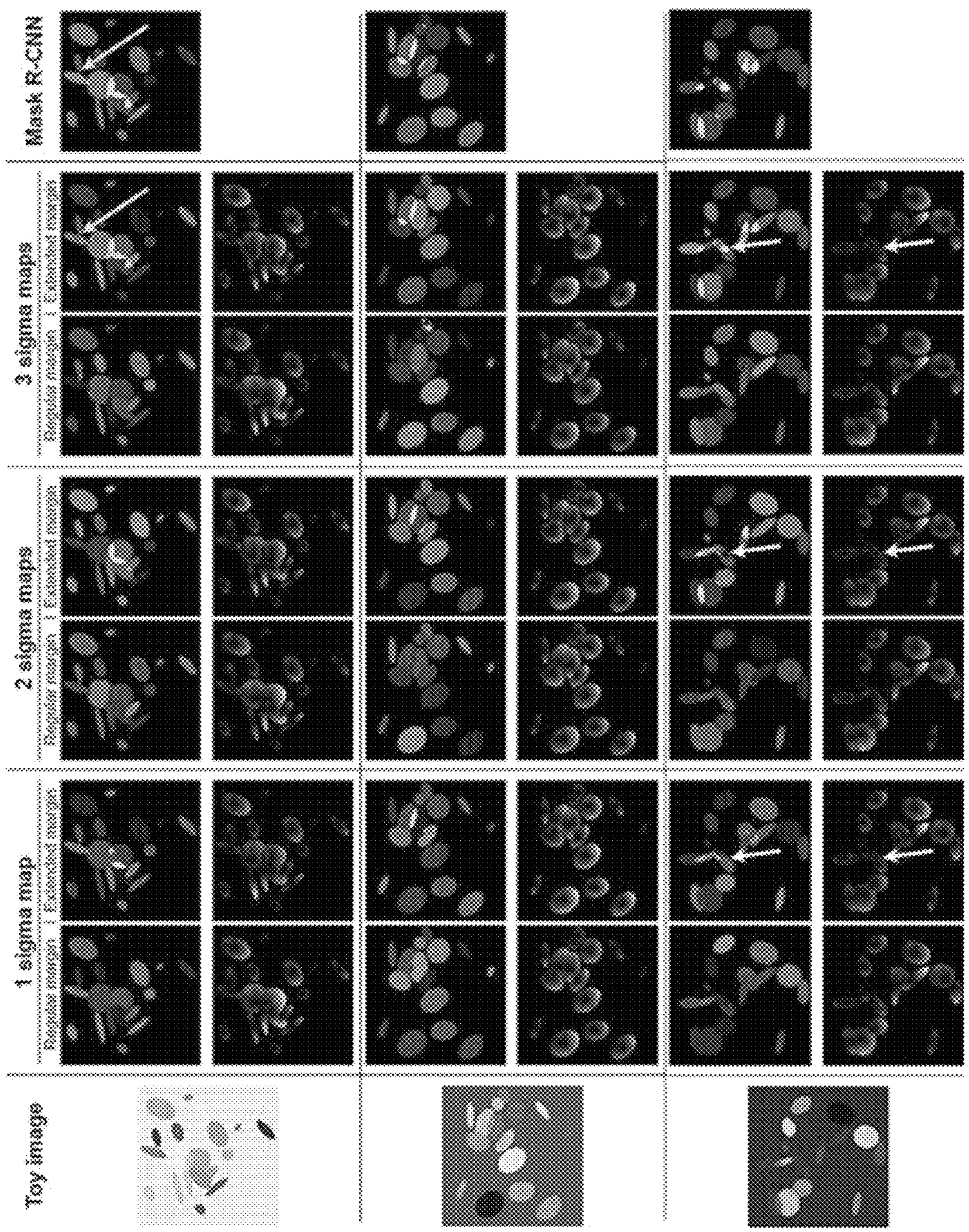
FIG. 7 is an example diagram for describing spatial embedding of a generated dataset according to an embodiment.
Figure 8:
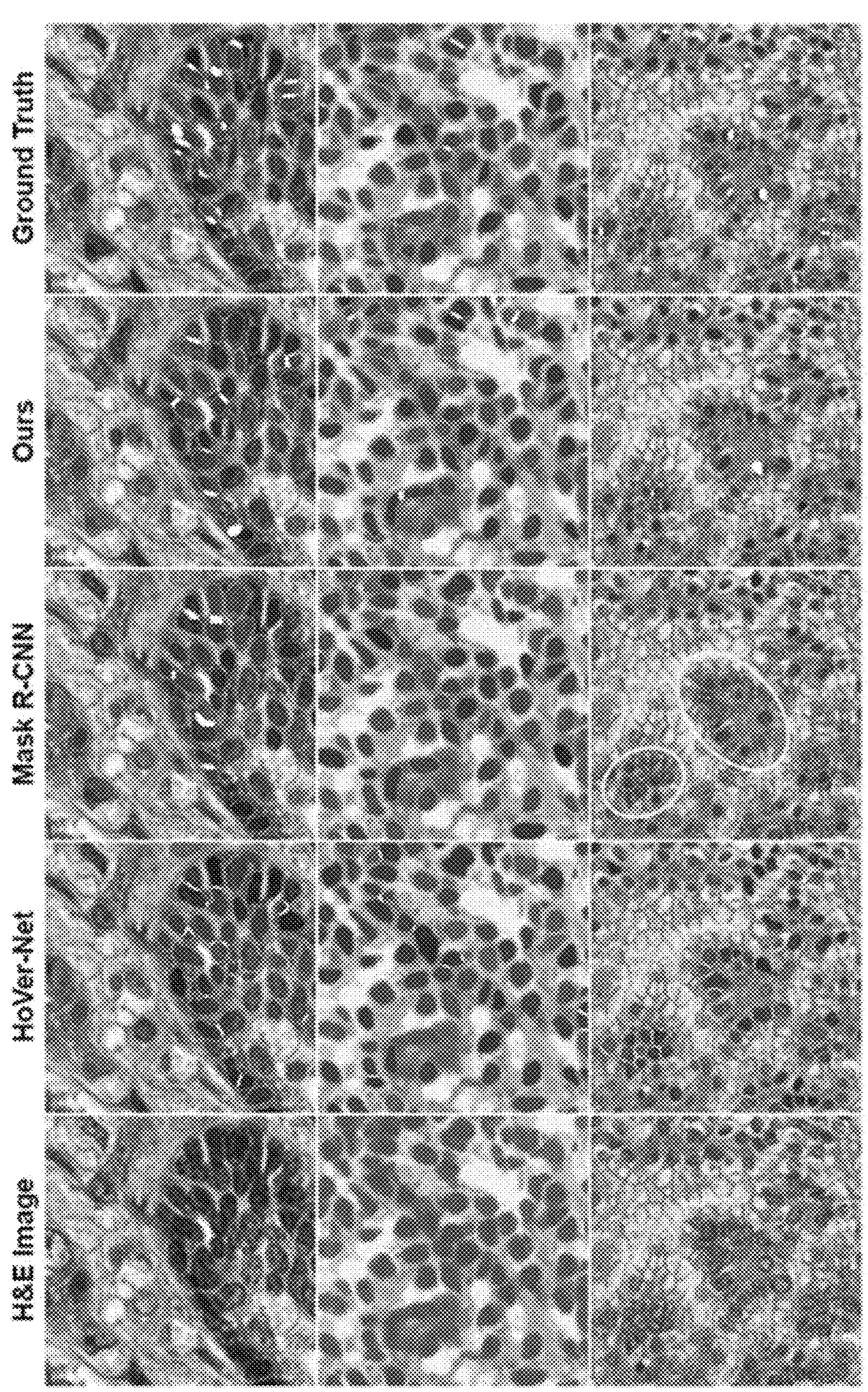
FIG. 8 is an example diagram illustrating qualitative results of the bottom-up segmentation model according to an embodiment.

FIG. 6 is an example diagram for describing metrics for evaluating amodal prediction matching according to an embodiment, FIG. 7 is an example diagram for describing spatial embedding of a generated dataset according to an embodiment, and FIG. 8 is an example diagram illustrating qualitative results of the bottom-up segmentation model according to an embodiment.

Actual histopathology data may be affected by low acquisition quality, noise, cells at different life stages, and other variations that may lead to differences in expert opinion.

Accordingly, in an embodiment, as illustrated in FIG. 7, an experiment may be performed by creating a Toy dataset (hereinafter referred to as a synthetic dataset) including images having ellipses representing cellular instances independent of color and texture.

In an embodiment, a synthetic dataset may be used to evaluate how the bottom-up segmentation model is performed in various patterns, sizes, and shared regions having well-defined boundaries.

A synthetic dataset includes several instances having random colors for both the background and the foreground, and shared regions may be mixed to simulate the presence of translucent objects. Since the synthetic dataset does not include solid occlusion, a hallucination image is not needed for the bottom-up segmentation model.

Further, in an embodiment, to study nuclear segmentation, experiments may be performed using a publicly available benchmark dataset (MoNuSeg Dataset). Raw annotation of the benchmark dataset (hereinafter referred to as public dataset) is amodal, and training data may include 30 tissue images having single class nuclear boundary annotation.

An image may be extracted from H&E whole slide images (WSI) each captured at 40×, that is, a single image per slide. Each WSI is a sample taken from seven organs of a single patient, that is, breast, liver, kidney, prostate, bladder, colon, and stomach, and may include both benign and diseased tissues.

Test data from the public dataset may include 14 images from seven organs, that is, kidney, lung, colon, breast, bladder, prostate, and brain. Lung and brain tissues are only available in a test set.

Meanwhile, nuclear instance segmentation performance may use various metrics with the goal of rewarding excellent mask prediction and penalizing false positives and negatives.

This algorithm for optimizing performance of nuclear instance segmentation has an initial pair matching step, and in the next step, scores of matching and mismatching parts may be calculated for both GT and prediction.

Metrics for calculating scores in this way may include the Ensemble Dice coefficient (DICE_2), the Adjusted Jaccard Index (AJI) method, the Panoptic Quality (PQ) method, etc.

All of these metrics may each define a pair set and evaluate a degree of match between prediction and label to penalize each of a pixel outside the instance, missing prediction, and a segment not having a matching pair.

More specifically, the ensemble dice coefficient method matches all possible predicted segments overlapping with a GT segment and calculates an average dice coefficient by accumulating both overlapping regions and the sum of those regions. The ensemble dice coefficient method may ignore non-matching segments and impose excessive penalties, as shown in prediction A of FIG. 6.

The adjusted Jaccard index method is a metric similar to the ensemble dice coefficient method, which uses Intersection Over Union (IoU) instead and accumulates the Intersections Union before calculating the average IoU. The adjusted Jaccard index method may potentially use predicted segments of two or more GT segments and may result in excessive penalties in cases of partially overlapping regions for which there is no better match, such as prediction A of FIG. 6.

The panoptic quality method is introduced to evaluate nuclear instance segmentation to enable more accurate quantification and interpretation, which may be decomposed into detection quality (DQ) and segmentation quality (SQ) to provide insights for analysis. The panoptic quality method has been mathematically proven to solve a matching problem by only accepting pairs satisfying IoU >0.5 and generate unique matches.

However, to properly evaluate the quality of amodal prediction, the above metrics alone are restrictive and extension is required to account for shared pixels in overlapping regions.

In the case of an amodal mask, under the condition IoU>0.5, there is no uniqueness in the presence of occlusion. Therefore, in an embodiment, it is possible to extend previous metrics for amodal segmentation based on unique matches (aDICE_2, aAJI, and aPQ) by taking inspiration from PQ.

That is, in an embodiment, it is possible to first identify prediction reporting the highest IoU for each GT segment and simultaneously identify a label with the highest IoU for each prediction segment.

Therefore, an extended metric of an embodiment may be considered a unique match for labels and predictions having the same pair across all IoU conditions (see predictions A and B of FIG. 6).

That is, the extended metric of the embodiment may solve the problem of excessive penalties present in previous implementations and produce more consistent measurements when evaluating similar predictions, such as A, B, C, and D of FIG. 6. Predictions C and D may indicate consistency between modal and amodal cases.

The extended metric of the embodiment is applicable to both modal and amodal tasks (see predictions C and D of FIG. 6), but may remove excessive penalties in DICE_2 and AJI (see prediction A of FIG. 6).

In an embodiment, a penalty may be applied to segments, GTs, and predictions not matching in the common denominator of the aforementioned metrics.

Therefore, the redefined aDICE_2 and aAJI scores cannot be directly compared to previous implementations. However, benefits previously present in PQ may be added using unique matches.

Meanwhile, common data augmentation techniques applied to histopathology images may include random image flip, rotation, Gaussian blur or sharpening, changes in contrast and brightness, and addition of Gaussian noise.

However, this transformation alone may be insufficient to account for differences between laboratories. Unlike commonly used color normalization methods, staining variation may be a key component to increase the ability of the CNN in generalization to unseen data.

In an embodiment, random channel-wise mixing of an original image may be performed during training, which may be normalized and may be a grayscale version. This allows generation of a larger image set using several stain combinations.

Further, in an embodiment, the number of quantization levels may be modified during training to make the bottom-up segmentation model robust to various levels of image quality. Images frequently have 256 quantization levels due to 8-bit encoding, and thus it is possible to enable the bottom-up segmentation model to learn a method of identifying a nucleus and a boundary thereof in an extremely low-quality image by randomly varying available quantization levels from 10 to 256.

In an embodiment, for training, random truncation of 256×256 may be performed, a truncated image may be enlarged, and a label of an incomplete instance at an image edge may be ignored. Such an instance is completed in another crop, and thus may be ignored.

Therefore, the bottom-up segmentation model may focus only on full-size instances and potentially avoid creating artifacts in a learning process.

During inference, it is possible to use a sliding window of the same size having a stride of 128 to make prediction only valid for a complete instance. A merging process for several crops may be performed using only a predicted instance of a 128×128-region around a center point. An overlapping region is detected during inference and merging steps, and thus all instances may remain complete throughout the entire process.

In an embodiment, for example, a lightweight ERFNet may be used as a CNN backbone network. All experiments may be performed using a PyTorch deep learning library having a GPU acceleration function on a machine equipped with an RTX 2080 Ti. An Adam optimization program may be applied at an initial learning rate of $5\times10^{-3}$ at which an exponential decay decreases to $1\times10^{-5}$ during 100 epochs for synthetic data and 2000 epochs for pathological data.

In an embodiment, it has been possible to evaluate whether the bottom-up segmentation model may handle a common instance pattern seen in a histopathology image using artificial data. However, an accurate label has been used.

Referring to FIG. 7, it can be seen how clustering having a periodic margin cannot perform amodal segmentation, and that an instance may be truncated at a shared boundary as a result. Here, the cluster may reduce the size of the margin. This is due to the loss target of bringing the spatial embedding to a single center per instance.

That is, referring to FIG. 7, space embedding has a significant impact on a result of segmentation at the intersection. A model having an extended margin generates an offset to share pixels in a region (yellow arrow) having overlapping clusters. However, only an elliptical margin (3 Sigma Map), which has a freedom in rotation, may be used for successful amodal segmentation. It can be seen that MASK R-CNN usually favorably performs instance segmentation in an image of a synthetic dataset, but cannot detect a small instance in a crowded region (two arrows of right images on a first row of FIG. 7).

A result having periodic margins may show a single center per instance in the space embedding and identify sharp boundaries in overlapping regions based on color differences. Thus, using periodic margins may lead to an unnaturally segmented mask, not suitable for amodal segmentation.

On the other hand, the extended margin modifies spatial embedding at an intersection to allow pixel sharing and enables clusters to configure a complete instance mask by capturing several centers. In addition, arrows show that all types of margin shapes produce similar embedding. However, it can be seen that an extended elliptical margin having a freedom in rotation is more powerful (see arrows of images on two lower rows of FIG. 7).

TABLE 1

| Method | aDICE_2 | aAJI | aPQ |
|---|---|---|---|
| 1σ | 0.973 | 0.947 | 0.960 |
| 1σ + (ext-m) | 0.976 | 0.953 | 0.957 |
| 2σ | 0.995 | 0.943 | 0.954 |
| 2σ + (ext-m) | 0.976 | 0.952 | 0.956 |
| 3σ | 0.971 | 0.943 | 0.953 |
| 3σ + (ext-m) (Ours) | 0.978 | 0.957 | 0.960 |
| Mask R-CNN | 0.966 | 0.934 | 0.922 |

Table 1 shows training results of the bottom-up segmentation model using the synthetic dataset. Segmentation quality metrics demonstrate the importance of a 3-sigma map having extended margins to accurately segment intersections. Mask R-CNN has lower scores due to poor bounding box alignment and low resolution and mask. Here, σ represents the sigma map and (ext-m) represents the extended margin.

Referring to Table 1, it is possible to see that the proposed three sigma maps and the proposed elliptic margin (Ours) having extended margin are significantly improved over previous methods. It can be seen that Mask RCNN may be used for amodal segmentation in natural images and shows reasonable performance, but is limited in segmenting small instances in crowded regions (see two arrows of right images on the first row of FIG. 7). For this reason, lower results were obtained compared to the bottom-up technique that uses only one sigma map.

Using an amodal mask during training allows the model to better learn a method of segmenting nuclei in clustered regions (using public datasets). Referring to FIG. 8, it can be seen that the bottom-up segmentation model of the embodiment may successfully segment various tissue types having nuclei of various sizes and shapes.

For example, the bottom-up segmentation model (Ours) outputs successful results even for tips of significantly small cluster nuclei, while other methods fail to separate or entirely miss instances. A reason therefor is that a top-down method such as Mask R-CNN cannot detect small instances or perform accurate delineation through bounding boxes. Even though HoVer-Net may reasonably detect small nuclei, results do not accurately reflect the actual nuclear characteristics. That is, shapes of some nuclei are not elliptical or irregular.

TABLE 2

| Methods | Amodal | DICE_2 | AJI | DQ | SQ | PQ |
|---|---|---|---|---|---|---|
| Mask R-CNN* ◇ | | — | 0.546 | 0.704 | 0.720 | 0.509 |
| DIST* ◇ | | — | 0.559 | 0.601 | 0.732 | 0.443 |
| HoVer-Net* ◇ | | — | 0.618 | 0.770 | 0.773 | 0.597 |
| CDNet* ◇ | | — | 0.633 | — | — | — |
| | | aDICE_2 | aAJI | aDQ | aSQ | aPQ |
| HoVer-Net* | | 0.754 | 0.609 | 0.844 | 0.714 | 0.604 |
| Mask R-CNN* | ✓ | 0.738 | 0.587 | 0.833 | 0.715 | 0.596 |
| ASense* | ✓ | 0.745 | 0.595 | 0.840 | 0.726 | 0.610 |
| HoVer-Net† | | 0.749 | 0.601 | 0.861 | 0.721 | 0.621 |
| Mask R-CNN† | ✓ | 0.766 | 0.622 | 0.883 | 0.734 | 0.649 |
| ASense† | ✓ | 0.772 | 0.631 | 0.877 | 0.746 | 0.655 |
| Mask R-CNN‡ | ✓ | 0.773 | 0.631 | 0.885 | 0.733 | 0.649 |
| ASense‡ | ✓ | 0.797 | 0.663 | 0.897 | 0.759 | 0.681 |

Table 2 shows training results of the bottom-up segmentation model using a public dataset (for example, MoNuSeg). That is, Table 2 shows competition scores for conventional methods. The bottom-up segmentation model in the embodiment uses amodal spatial embedding, and is hereinafter referred to as bottom-up segmentation model (ASense).

Reference results at the top of Table 2 (marked with diamonds) are not directly comparable since updated metrics are not used, and an actual foreground mask may differ by a few pixels at a boundary. That is, an amodal mask was directly extracted from the raw annotation using an algorithm.

For this reason, in an embodiment, the formal HoVer-Net pretrained model was re-evaluated using metrics and labels for the same data. (*), (†), and ‡) shown in the table indicate that different pieces of data were used.

In most cases, Mask R-CNN scores were lower than scores of the bottom-up segmentation model (ASense). In the (*) dataset, HoVer-Net achieves better aDICE_2 and aAJI, but reports lower aSQ due to performance differences for larger and smaller instances. In other words, the results were better in small nuclei. However, in the (†) dataset, the bottom-up segmentation model (ASense) shows superior performance due to the presence of additional organ tissues that could be segmented more accurately. Lastly, in the (‡) dataset, the bottom-up segmentation model (ASense) shows more improvements compared to other comparison methods.

TABLE 3

| Method | CNN only [sec/img] | Average [sec/img] | Total [sec] |
|---|---|---|---|
| HoVer-Net | — | 6.15 | 184.6 |
| Mask R-CNN | 1.19 | 1.57 | 47.2 |
| ASense | 0.02 | 1.56 | 46.7 |

Table 3 shows the inference time. All 30 H&E images each having a size of 1000×1000 pixels in a public dataset may be inferred on a workstation having a single GPU.

Referring to Table 3, the bottom-up segmentation model (ASense) of the embodiment performs inference much faster than HoVer-Net and is similar to Mask R-CNN, which is a mature and optimized method.

Further optimization of the clustering and amodal aggregation masks may potentially speed up the process, since the CNN forward pass of the bottom-up segmentation model (ASense) requires significantly shorter execution times.

That is, in an embodiment, quality of nuclear instance segmentation in a histopathology image may be improved by using a bottom-up strategy of clustering objects using a Gaussian function that directly optimizes spatial embedding for amodal segmentation.

As can be seen from the above experimental results, the bottom-up instance segmentation apparatus 100 of the embodiment may capture a natural position of a nucleus and an amodal mask for high-quality delineation in difficult regions having overlapping parts.

In addition, the bottom-up instance segmentation apparatus 100 may extend the existing nuclear segmentation metric to handle amodal labels and predictions as well as make the existing nuclear segmentation metric more stable, eliminating a problem of excessive penalties in the past.

Further, in an embodiment, competitive performance and applicability may be verified by performing extensive evaluation of the bottom-up instance segmentation apparatus 100 on both synthetic and public datasets.

Figure 9:
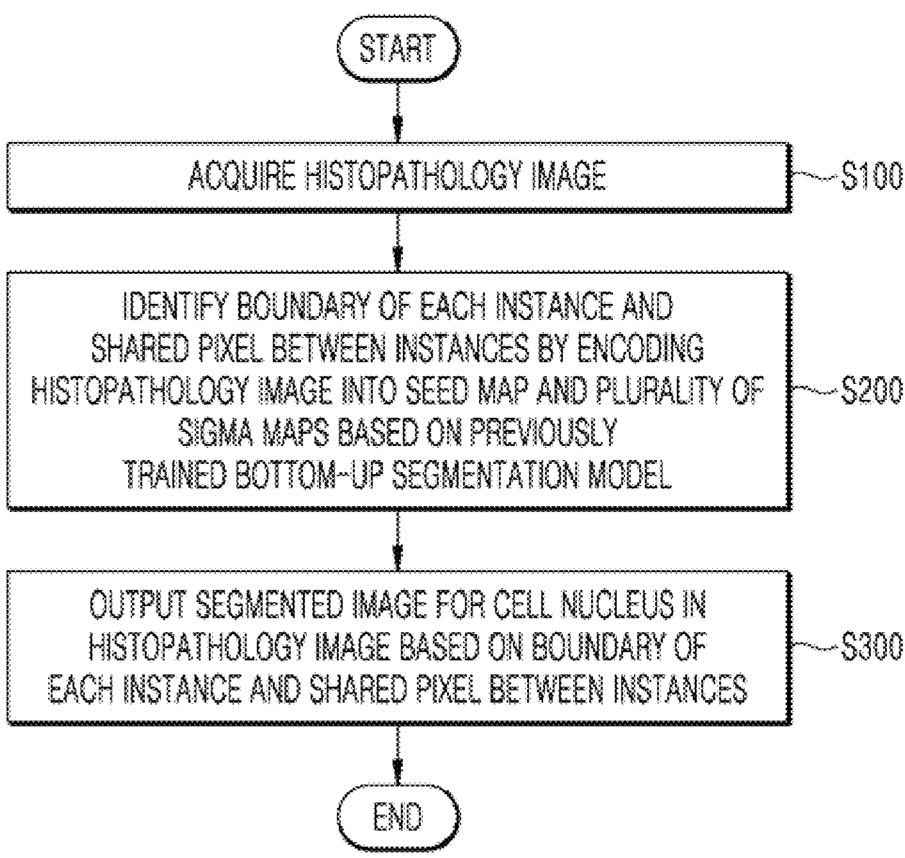
FIG. 9 is a flowchart for describing a bottom-up instance segmentation method according to an embodiment.

FIG. 9 is a flowchart for describing a bottom-up instance segmentation method according to an embodiment.

Referring to FIG. 9, in step S100, the processor 140 acquires a histopathology image.

In step S200, the processor 140 identifies a boundary of each instance and a shared pixel between instances by encoding the histopathology image into a seed map and a plurality of sigma maps based on a previously trained bottom-up segmentation model.

In this instance, the previously trained bottom-up segmentation model is a trained model that clusters each pixel into an instance based on an optimal offset for a center of an object. The optimal offset is the sum of coordinates of each pixel and an offset vector for the corresponding pixel.

This previously trained bottom-up segmentation model may be subjected to unsupervised learning of spatial embedding and margin of the histopathology image based on a Gaussian function (see Equation 5), and may be configured to perform seed map-based sampling to perform clustering around the center of each instance, thereby inferring the boundary and each pixel and the shared pixel of the histopathology image.

The processor 140 may perform spatial embedding for each pixel on the histopathology image to identify a boundary of each instance and a shared pixel between instances, and group each pixel and shared pixel between instances based on a spatial embedding result.

Further, the processor 140 may estimate a margin, which is a distance allowed from the center of each instance to an instance to which the spatial embedding pixel corresponds, based on a plurality of sigma maps.

Here, the plurality of sigma maps includes three sigma maps that estimate margins of each instance in an x-axis direction, a y-axis direction, and a rotation direction.

Further, the plurality of sigma maps may be derived using each of coefficients $a_k$, $b_k$, and $c_k$ of a Gaussian function $\phi_k(e_i)$ for conversion into a probability that the spatial embedding pixel belongs to the corresponding instance, based on a distance between the spatial embedding pixel and the center of the corresponding instance (see Equation 5)).

In this instance, each of the coefficients $a_k$, $b_k$, and $c_k$ may be derived based on an x-sigma value $\sigma_{kx}$, a y-sigma value $\sigma_{ky}$, and a rotation angle.

Further, the processor 140 may estimate a margin of each instance based on a sigma parameter of the Gaussian function. In this instance, the sigma parameter may include the x-sigma value $\sigma_{kx}$, the y-sigma value $\sigma_{ky}$, and the rotation angle of each of the coefficients $a_k$, $b_k$, and $c_k$.

That is, the processor 140 may estimate the size and shape of the margin based on the sigma parameter according to the size and shape of each instance. That is, in an embodiment, all possible shape variations may be captured.

In this instance, the processor 140 may learn the sigma parameter so that the value of the Gaussian function becomes 1 when the value of the Gaussian function is greater than or equal to a preset probability threshold. A reason therefor is that pixels in the shared region need to have flexibility to have smaller offset values and a margin large enough to cover pixels near the center and in overlapping regions. Therefore, pixels in the shared region may not be forced to be segmented between overlapping instances.

Meanwhile, the processor 140 may determine a clustering region based on the estimated margin and determine whether each instance includes a shared pixel based on the determined clustering region.

Further, the processor 140 may sample spatial embedding pixels to determine the center of each instance based on the seed map. The seed map may control a sampling order until the available foreground region is exhausted.

In step S300, the processor 140 outputs a segmented image for a cell nucleus in the histopathology image based on a boundary of each instance and a shared pixel between instances.

Embodiments of the present disclosure described above may be implemented in the form of computer programs that may be executed through various components on a computer, and such computer programs may be recorded in a computer-readable medium. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the art of computer software. Examples of program code include both machine code, such as that produced by a compiler, and higher level code that may be executed by the computer using an interpreter.

As used in the present disclosure (particularly in the appended claims), the term "the" and similar demonstrative terms include both singular and plural references. Also, it should be understood that any numerical range recited herein is intended to include all sub-ranges subsumed therein (unless expressly indicated otherwise) and accordingly, the disclosed numerical ranges include every individual value between the minimum and maximum values of the numerical ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereto.

Therefore, the present disclosure is thus not limited to the example embodiments described above, and rather is intended to include the following appended claims, and all modifications, equivalents, and alternatives falling within the spirit and scope of the following claims.

Meanwhile, this invention is supported by the national research and development project described below.

Project 1)

[Project identification number] 1711143243

[Project number] 2019R1C1C1008727

[Ministry Name] Ministry of Science and ICT

[Name of project management (professional) organization] National Research Foundation of Korea

[Research project name] Development of artificial intelligence that describes current conditions and future prognostic changes through medical image analysis

[Research project title] Development of artificial intelligence that describes current conditions and future prognostic changes through medical image analysis

[Contribution rate] 1/2

[Name of organization carrying out project] Daegu Gyeongbuk Institute of Science and Technology

[Research period] Mar. 1, 2021 to Feb. 28, 2022

Project 2)

[Project identification number] 1415175070

[Project number] 20001533

[Ministry Name] Ministry of Trade, Industry and Energy

[Name of project management (professional) organization] Korea Planning & Evaluation Institute of Industrial Technology

[Research project name] Development of commercialization of AI convergence multi-image endoscopic microscope capable of on-site diagnosis

[Research project title] Development of commercialization of AI convergence multi-image endoscopic microscope capable of on-site diagnosis

[Contribution rate] 1/2

[Name of organization carrying out project] GREENSPEC

[Research period] Jan. 1, 2021 to Dec. 31, 2021

The invention claimed is:

1. A bottom-up instance segmentation method, at least some of respective steps being performed by a processor, the bottom-up instance segmentation method comprising: acquiring an image; identifying a boundary of each instance (k) and a shared pixel between instances by encoding the image into a seed map and a plurality of sigma maps based on a previously trained bottom-up segmentation model; and outputting a segmented image for an object in the image based on the boundary of each instance and the shared pixel between instances, wherein the identifying comprises: performing spatial embedding for each pixel for the image; grouping each pixel and the shared pixel between instances based on a result of the spatial embedding; and estimating a margin, which is a distance allowed from a center of each instance to an instance to which a pixel of the spatial embedding corresponds, based on the plurality of sigma maps, wherein the plurality of sigma maps includes three sigma maps that estimate margins of each instance in an x-axis direction, a y-axis direction and a rotation direction, wherein the plurality of sigma maps is derived using each of coefficients ak, bk, and ck of a Gaussian function øk(ei) for conversion into a probability that the spatial embedding pixel belongs to the corresponding instance, based on a distance between the spatial embedding pixel and a center of a corresponding instance, and each of the coefficients ak, bk, and ck is derived based on an x-sigma value σkx, a y-sigma value σky, and a rotation angle:

$$\phi_k(e_i) = \exp(-(a_k(e_{ix} - C_{kx})^2 + 2b_k(e_{ix} - C_{kx})(e_{iy} - C_{ky}) + c_k(e_{iy} - C_{ky})^2)), \quad \text{[Gaussian function } \phi_k(e_i)\text{]}.$$

wherein the estimating comprises estimating a margin of each instance based on a sigma parameter of the Gaussian function, wherein the sigma parameter comprises the x-sigma value σkx, the Y-sigma value σky, and the rotation angle of each of the coefficients ak, bk, and ck, and wherein the estimating further comprises learning the sigma parameter so that a value of the Gaussian function becomes 1 when a value of the Gaussian function is greater than or equal to a preset probability threshold.

2. The bottom-up instance segmentation method according to claim 1, wherein the previously trained bottom-up segmentation model is a trained model trained to cluster each pixel into an instance based on an optimal offset for a center of the object.

3. The bottom-up instance segmentation method according to claim 1, wherein the estimating comprises estimating a size and a shape of the margin based on the sigma parameter according to a size and a shape of each instance.

4. The bottom-up instance segmentation method according to claim 1, wherein the identifying comprises:

determining a clustering region based on the estimated margin; and determining whether a shared pixel is included in each instance based on the clustering region.

5. The bottom-up instance segmentation method according to claim 4, wherein the identifying comprises sampling a spatial embedding pixel for determining a center of each instance based on the seed map.

6. A non-transitory computer-readable recording medium storing a program that causes at least one processor to perform the method according to claim 1, when executed by the at least one processor.

7. A bottom-up instance segmentation apparatus comprising: a memory; and at least one processor connected to the memory and configured to execute computer-readable instructions included in the memory, wherein the at least one processor is set to perform operations of: acquiring an image; identifying a boundary of each instance (k) and a shared pixel between instances by encoding the image into a seed map and a plurality of sigma maps based on a previously trained bottom-up segmentation model; and outputting a segmented image for an object in the image based on the boundary of each instance and the shared pixel between instances, wherein the identifying comprises: performing spatial embedding for each pixel for the image; grouping each pixel and the shared pixel between instances based on a result of the spatial embedding; and estimating a margin, which is a distance allowed from a center of each instance to an instance to which a pixel of the spatial embedding corresponds, based on the plurality of sigma maps, wherein the plurality of sigma maps includes three sigma maps that estimate margins of each instance in an x-axis direction, a y-axis direction and a rotation direction, wherein the plurality of sigma maps is derived using each of coefficients ak, bk, and ck of a Gaussian function øk(ei) for conversion into a probability that the spatial embedding pixel belongs to the corresponding instance, based on a distance between the spatial embedding pixel and a center of a corresponding instance, and each of the coefficients ak, bk, and ck is derived based on an x-sigma value σkx, a y-sigma value σky, and a rotation angle:

$$\phi_k(e_i) = \exp(-(a_k(e_{ix} - C_{kx})^2 + 2b_k(e_{ix} - C_{kx})(e_{iy} - C_{ky}) + c_k(e_{iy} - C_{ky})^2)), \quad \text{[Gaussian function } \phi_k(e_i)\text{]}$$

wherein the estimating comprises estimating a margin of each instance based on a sigma parameter of the Gaussian function, wherein a size and a shape of the margin is estimated based on the sigma parameter according to a size and a shape of each instance, wherein the sigma parameter comprises the x-sigma value σkx, the Y-sigma value σky, and the rotation angle of each of the coefficients ak, bk, and ck, and wherein the estimating further comprises learning the sigma parameter so that a value of the Gaussian function becomes 1 when a value of the Gaussian function is greater than or equal to a preset probability threshold.

8. The bottom-up instance segmentation apparatus according to claim 7, wherein the previously trained bottom-up segmentation model is a trained model trained to cluster each pixel into an instance based on an optimal offset for a center of the object.

9. The bottom-up instance segmentation apparatus according to claim 7, wherein the identifying comprises:

determining a clustering region based on the estimated margin; and determining whether a shared pixel is included in each instance based on the clustering region.

10. The bottom-up instance segmentation apparatus according to claim 9, wherein the identifying comprises sampling a spatial embedding pixel for determining a center of each instance based on the seed map.

* * * * *